M. SCOTT, G. W. & W. D. SHERWOOD.
Earthenware Saucepan.

No. 225,492.      Patented Mar. 16, 1880.

Witnesses.
L. C. Fitler.
Jno K. Smith

Inventor.
Montezuma Scott
George W. Sherwood
William D. Sherwood
by their attorneys
Bakewell & Kerr

UNITED STATES PATENT OFFICE.

MONTEZUMA SCOTT, GEORGE W. SHERWOOD, AND WILLIAM D. SHERWOOD, OF NEW BRIGHTON, PENNSYLVANIA.

EARTHENWARE SAUCEPAN.

SPECIFICATION forming part of Letters Patent No. 225,492, dated March 16, 1880.

Application filed December 18, 1879.

*To all whom it may concern:*

Be it known that we, MONTEZUMA SCOTT, GEORGE W. SHERWOOD, and WILLIAM D. SHERWOOD, of New Brighton, in the county of Beaver and State of Pennsylvania, have invented a new and useful Improvement in Earthenware Saucepans; and we do hereby declare the following to be a full, clear, and exact description thereof, reference being had to the accompanying drawings, forming part of this specification, in which—

Figure 1:
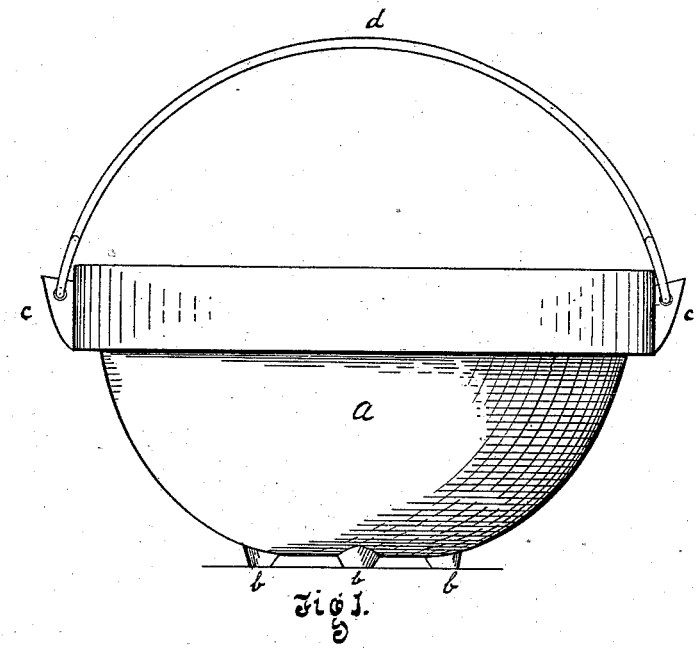
Figure 2:
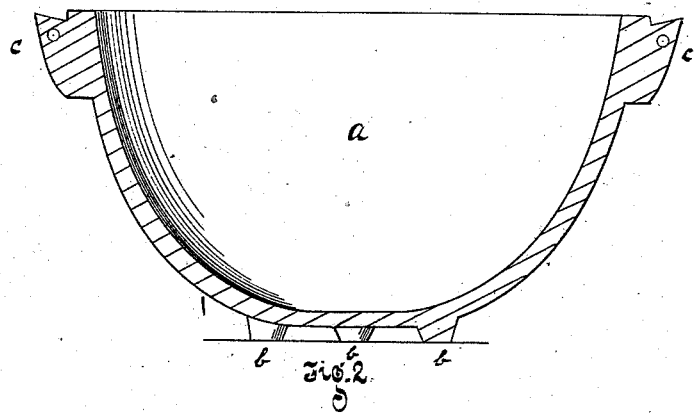

Figure 1 is a side elevation, and Fig. 2 a vertical section.

Our invention consists in a saucepan of earthenware of such form that it may be subjected to heat without being liable to be cracked and broken thereby, and having lugs or projections which form an integral part thereof.

Heretofore, so far as we are aware, earthen or stone ware vessels suitable for cooking purposes that will withstand the necessary degree of heat have not been made. The reason of this has been that such vessels have been constructed of irregular shape and thickness, generally having a rim around the bottom. The heat causes the earthenware to expand, and the expansion being unequal at different points causes the vessel to break or crack generally at that point where the expansion is greatest.

Our invention, which we will now proceed to describe, obviates this difficulty.

In the drawings, $a$ is an earthenware vessel or saucepan, the bottom of which has a regular surface, and is slightly rounded or dome-shaped, having a regular curve excepting at the points $b$, where there are projections or feet, three or more in number. At or near the upper edge or circumference of the vessel are lugs or projections $c$, to which is fastened the wire bail $d$.

The vessel is formed of potter's clay, preferably by placing the clay in a mold and working it in the usual manner. The mold is provided with suitable depressions for forming the projections or feet $b$ and lugs $c$, which are thereby made part of the vessel, and are not additions thereto after the vessel has been formed. After the vessel has been taken from the mold it is dried, baked, and glazed in the usual manner.

The purpose of the feet $b$ is to keep the bottom of the vessel from coming in contact with the stove, and as they are small and made a part of the vessel, and not additions thereto, they are not liable to be broken by the action of the heat. The vessel, being rounded and having a smooth regular bottom of uniform, or nearly uniform, thickness, expands gradually and equally throughout, and is therefore able to withstand a greater degree of heat than earthenware vessels of an irregular shape.

It is designed to be used by placing it on the stove, but it should not be exposed to the direct action of the flames. It is especially useful for slow cooking, and is therefore a very desirable vessel for cooking many articles of food which can be properly cooked only in that way, and also to prevent the objectionable discoloring arising with some articles of food when cooked in metallic vessels.

What we claim as our invention, and desire to secure by Letters Patent, is—

1. An earthenware saucepan the bottom of which is rounded and has a regular surface of or about an equal thickness throughout, substantially as and for the purpose described.

2. The earthenware saucepan herein described, having lugs and projections for handles and feet integral therewith, substantially as described.

In testimony whereof we, the said MONTEZUMA SCOTT, GEORGE W. SHERWOOD, and WILLIAM D. SHERWOOD, have hereunto set our hands.

MONTEZUMA SCOTT.
GEORGE W. SHERWOOD.
WILLIAM D. SHERWOOD.

Witnesses:
JAMES H. MANN,
AGNEW DUFF.